United States Patent Office 3,191,109
Patented June 22, 1965

3,191,109
STEERING MECHANISM WITH MANUAL AND
ELECTRIC DRIVE FOR MOTOR VEHICLES
Neal Hepner, 4246 Sandy Lane, Birmingham, Mich.
Filed Mar. 7, 1962, Ser. No. 178,175
8 Claims. (Cl. 318—2)

This invention relates to steering mechanism for motor vehicles, and the like. The invention relates particularly to steering mechanism wherein manual operation of the steering mechanism is assisted by power.

At moderate and high speeds, a motor vehicle can generally be steered on a desired course with slight angular deflections of the steerable wheels. Under most moderate and high speed driving conditions it is essential that the steerable wheels respond instantly and precisely to rotational movements of the steering hand member so that angular deflections of the steerable wheels will be correctly timed and accurately executed, thus enabling the driver to maneuver the vehicle in the manner desired. When a suitable steering gear ratio is provided, most vehicles equipped with manually operated steering mechanism can be handled easily at moderate and high speeds because little physical energy is expended in turning the steerable wheels through the small range of angular deflections normally required in this type of driving.

At low vehicle speeds, and especially when driving on circuitous roads or in heavy traffic areas, it often becomes necessary for the driver of a motor vehicle to turn the steerable wheels from one extreme to the other, thus necessitating frequent and substantial rotational movements of the steering hand member. The maneuvering of a motor vehicle into or out of confined spaces, as when parking, sometimes requires that the steerable wheels be turned throughout the full range of travel several times before the operation has been completed, often with the vehicle stationary while the steering hand member is rotated. Driving operations requiring frequent and substantial rotational movements of the steering hand member involve the expenditure of considerable physical energy by the driver. Conventional power assisted steering mechanisms in common use relieve the vehicle driver of a portion of this steering burden by utilizing power operated apparatus to reduce the turning effort required to rotate the steering hand member. In some instances where power assisted steering devices are employed it has been found desirable to reduce the steering gear ratio so that fewer revolutions of the steering hand member are required to turn the steerable wheels through the range of angular travel provided; however, steering gear ratios cannot be reduced excessively because at higher vehicle speeds the steering mechanism would be too sensitive and, therefore, a driver would experience difficulty in steering a desired course because slight rotational movements of the steering hand member would result in undesirable veering of the vehicle.

It is a primary object of the present invention to provide steering mechanism for motor vehicles whereby sharp turns can be executed with little or no rotation of the steering hand member and without sacrifice of control at any vehicle speed.

In the present invention a power operable steering drive device is coupled between the steering hand member and the input element of the steering gear. When the power operable steering drive device is inactive, which ordinarily is a great percentage of the driving time, the steering mechanism will function in the familiar manner characteristic of conventional steering systems whereby it is necessary to rotate the steering hand member in order to effect turning of the steerable wheels. When the power operable steering drive device is active as, for example, when a turning maneuver is being initiated, the steering gear input element is caused to be power rotated with respect to the steering hand member, thus producing a steering effect upon the steerable wheels which is combined with the steering effect produced by manual rotation of the steering hand member.

A feature of the present invention is the adaptability of the proposed power operable steering drive device to a variety of different steering gear mechanisms utilized in general and specialized types of motor vehicles. The steering effect produced by the proposed power operable steering drive device is accomplished by independently rotating the same steering gear input element commonly controlled only by means of the steering hand member. Modification of conventional steering gear mechanism is not required.

Manually operated steering mechanisms have operating characteristics and other qualities which are very desirable; for example, manually operated steering mechanisms are instantly responsive, are extremely reliable and trouble free, and provide the driver with a roadway "feel" which is difficult to attain with power assisted steering mechanisms. It is an object of this invention to provide steering mechanism for motor vehicles which combines the above advantages of manually operated steering mechanisms with the advantages of power assisted steering mechanisms, thus contributing to the ease and pleasure of driving a motor vehicle.

Another object of this invention is to provide power assisted steering mechanism whereby failure of the power assisting mechanism will not interfere with the manual control of the vehicle and will not cause an increase in the effort required to effect rotation of the steering hand member.

Further objects of the invention are to provide power assisted steering mechanism which can be manufactured at low cost, which requires a minimum of power to operate, and which can be adapted for use as accessory or original equipment on a wide variety of motor vehicles.

Other objects, features and advantages of the invention will appear in the following description and appended claims, read in connection with the accompanying drawings in which is illustrated an exemplary form of power assisted steering mechanism embodying the present invention, this being indicative of but one of the various ways in which the principle of the invention may be employed. In the drawings:

FIGURE 3 is an end view of the novel steering hand member as would be observed by the vehicle driver. Portions of the control members have been broken away.

FIGURE 4 is an enlarged fragmentary section view of the steering hand member taken on section line 4—4 of FIGURE 3.

FIGURE 5 is an enlarged view taken on section line 5—5 of FIGURE 3 showing the cross-sectional configuration of the steering hand member spoke elements.

Before explaining the present invention in detail, it is to be understood that the invention is not limited in its application to the details of construction and arrangement of parts illustrated in the accompanying drawings, since the invention is capable of other embodiments and of being practiced or carried out in other ways. Also, it is to be understood that the phraseology or terminology employed herein is for the purpose of description and not of limitation.

Figure 1:
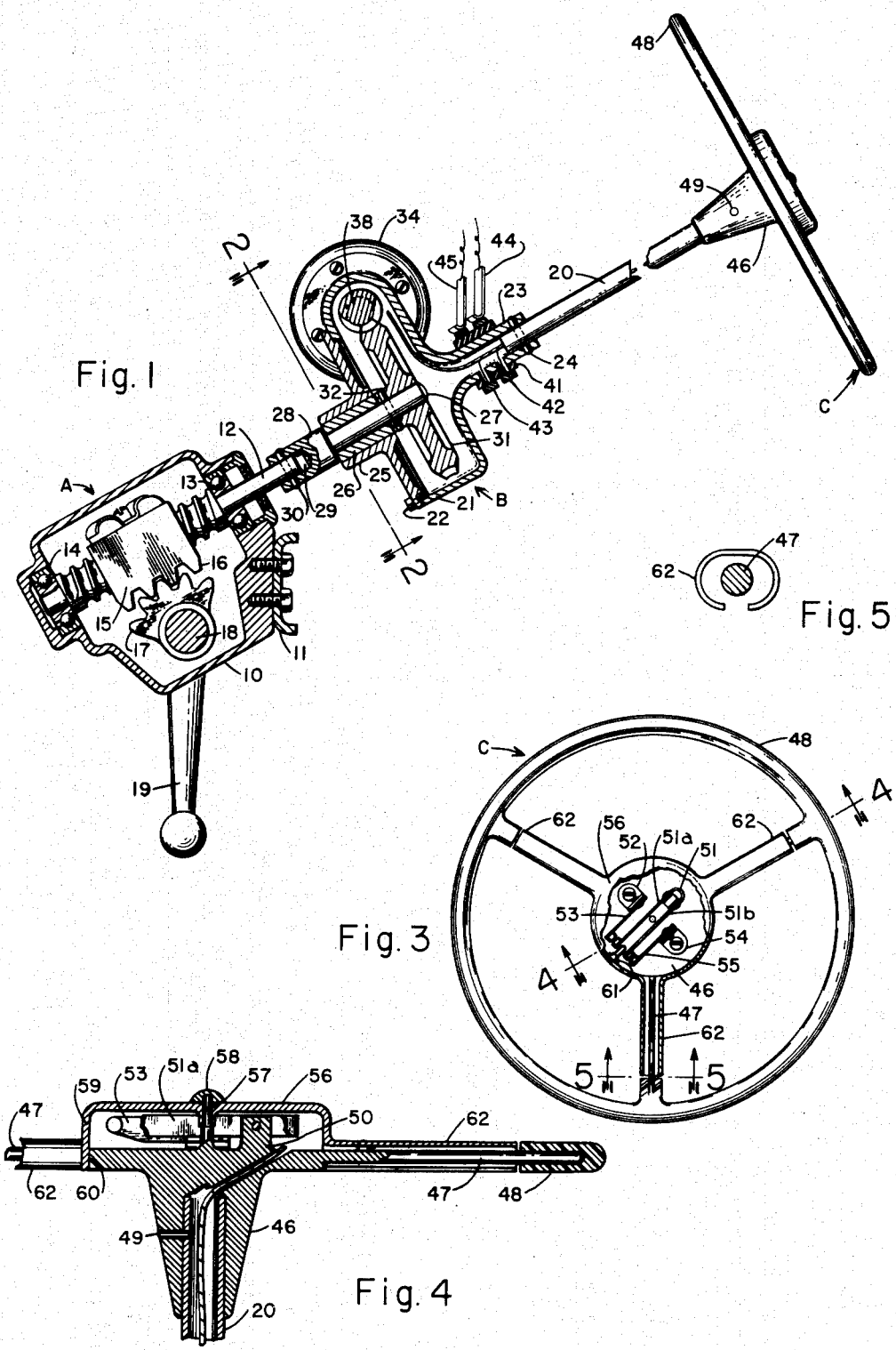
FIGURE 1 is a side elevational view showing the novel power operable steering drive device and steering hand member of the present invention coupled with the input element of a conventional steering gear secured in position on the frame structure of a motor vehicle. The power operable steering drive device and the steering gear are shown in section.

With reference to the drawings, a preferred arrangement of a power assisted steering mechanism incorporating the present invention is illustrated in FIGURE 1. The letter A denotes a steering gear having a casing 10 which is securely mounted onto the frame or structural member 11 of a motor vehicle. Casing 10 is adapted to receive the worm portion of steering gear input element 12. Steering gear input element 12 is mounted for rotation in bearings 13 and 14, the bearings being positioned and held securely within casing 10. Ball nut 15 is carried by the worm portion of steering gear input element 12. Ball nut 15 is provided with rack teeth 16 which mesh with the teeth of gear sector 17. Gear sector 17 is fixed onto rock shaft 18 which is an integral part of steering gear output member 19. It should be understood that the ball end of steering gear output member 19 is operably connected to the steerable wheels of the motor vehicle by means of steering linkage not shown. Steering gear A is of conventional design and operates in the well-known manner to multiply the turning effort impressed on the steerable wheels by the driver.

Figure 2:
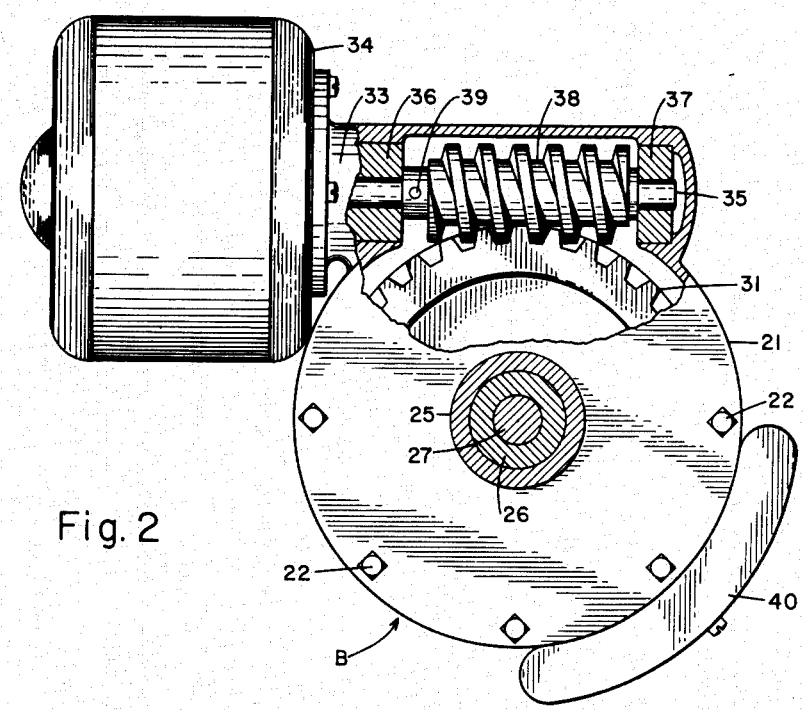
FIGURE 2 is an enlarged axial view of the power operable steering drive device taken on section line 2—2 of FIGURE 1. Portions of the carrier have been broken away.

My power operable steering drive device B is coupled between steering gear input element 12 and the lower end portion of a steering hand member shaft 20. Power operable steering drive device B includes a carrier member 21 formed of castings which are held together by bolts 22. One end of carrier member 21 has an extended hub 23 within which the lower end of steering hand member shaft 20 is mounted and held fast by a pin 24. The other end of carrier member 21 has a hub 25 within which is securely mounted a sleeve bearing 26. A stub shaft 27 is rotatable in sleeve bearing 26 and is supported thereby. Stub shaft 27 has an enlarged outer end portion 28 within which is an axial mounting hole 29 serving to receive the upper end of steering gear input element 12. A pin 30 is utilized to secure stub shaft 27 in fixed position on steering gear input element 12. A driven gear element 31 is mounted on the inner end of stub shaft 27 and secured in place with a pin 32. As illustrated in FIGURE 2, carrier member 21 has a flanged cavity 33 to which is mounted a reversible electric motor 34. Reversible electric motor 34 has an output shaft 35 which extends through and is supported by bearings 36 and 37. Bearings 36 and 37 are held securely in position within flanged cavity 33. A driving gear element 38 is mounted on output shaft 35 between bearings 36 and 37 and is secured in place thereon with a pin 39. Driving gear element 38 is in meshing relationship with driven gear element 31. A counterbalance 40 is secured to carrier member 21 for the purpose of balancing the power operable steering drive device B about the central axis thereof. The central axis of power operable steering drive device B is coincident with the center of stub shaft 27 and the center of extended hub 23. Firmly secured upon the outer surface of extended hub 23 is an insulator sleeve 41 on which is mounted electrical conductor rings 42 and 43. Sliding contacts 44 and 45 are in continuous electrical communication with electrical conductor rings 42 and 43, respectively. Electrical wiring extends from the inner surfaces of electrical conductor rings 42 and 43, through holes in insulator sleeve 41 and extended hub 23, into the interior portion of carrier member 21, and thence to reversible electric motor 34 and through the hollow steering hand member shaft 20, all in accordance with the electrical circuitry diagram of FIGURE 6 which will be described subsequently.

It is important to note that the power operable steering drive device B is not fixed to the vehicle structure. The entire power operable steering drive device B, with the exception of sliding contacts 44 and 45, is rotatable in unison with steering hand member shaft 20.

My steering hand member C includes a hub 46 having fixed spoke members 47 extending radially outward therefrom, as illustrated in FIGURES 3 and 4. The outer ends of fixed spoke members 47 terminate within a manual steering control element 48, thereby securing manual steering control element 48 in fixed relationship with hub 46. Hub 46 is firmly attached to the upper end portion of steering hand member shaft 20 and held in place with a pin 49. Hub 46 has a support arm 50 upon which is securely mounted a U-shaped spring conductor member 51. One arm of U-shaped spring conductor member 51 is designated 51a, and the other arm is designated 51b. The ends of arms 51a and 51b are provided with contact pads of any type suitable for use as switch contacts. A bracket 52 is attached to the upper end surface of hub 46. A stationary switch arm 53 is securely mounted upon bracket 52. Stationary switch arm 53 is provided with a contact pad which is oppositely aligned with the contact pad of arm 51a. A bracket 54 is attached to the upper end surface of hub 46 and a stationary switch arm 55 is securely mounted thereupon. Stationary switch arm 55 is provided with a contact pad which is oppositely aligned with the contact pad of arm 51b. The U-shaped spring conductor member 51 and the stationary switch arms 53 and 55 are mounted in a manner so as to be electrically insulated from hub 46 in instances where hub 46 is made of an electrically conductive material. A power steering control element 56 is pivotably mounted upon a center post 57 of hub 46 and held thereon by a cap 58. Power steering control element 56 has a cylindrically-shaped portion 59, the inside surface of which is a free running fit upon the outer diameter 60 of hub 46. A pin member 61 is securely fixed to the cylindrically-shaped portion 59 of power steering control element 56 in a position centrally aligned between arms 51a and 51b of U-shaped spring conductor member 51. The cylindrical surface of pin member 61 is electrically non-conductive. Power steering control element 56 has spoke members 62 formed integrally therewith. Spoke members 62 partially encircle the exposed portions of fixed spoke members 47, as may be seen in the sectional view of FIGURE 5. Normally, spoke members 62 are aligned centrally with respect to fixed spoke members 47 due to the action of U-shaped spring conductor member 51 upon pin member 61. Power steering control element 56 is rotationally shiftable with respect to hub 46 through a small angle which is controlled by the clearance between fixed spoke members 47 and the inside surfaces of spoke members 62.

Figure 6:
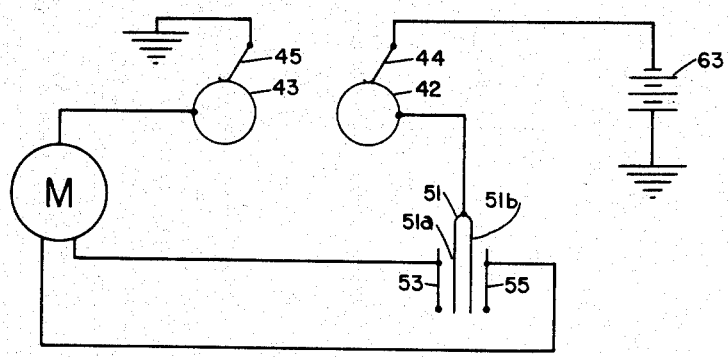
FIGURE 6 is a diagrammatic view of the electrical circuits for the power assisted steering mechanism illustrated in FIGURE 1.

Referring now to FIGURE 6, a source of electrical energy 63 is connected to sliding contacts 44 and 45 which are resiliently maintained in continuous electrical contact with electrical conductor rings 42 and 43, respectively. Electrical conductor ring 42 is connected to U-shaped spring conductor members 51. Stationary switch arm 53 is connected with the coil winding of reversible electric motor 34 which causes rotation of the motor in one direction. Stationary switch arm 55 is connected with the coil winding of reversible electric motor 34 which causes rotation of the motor in the opposite direction. The motor terminal which is common to both motor coil windings is connected to electrical conductor ring 43.

In operation, when reversible electric motor 34 is set in motion, driving gear element 38 will rotate driven gear element 31 with respect to carrier member 21, thus effecting rotational displacement of steering gear input element 12 with respect to steering hand member C. The direction of rotational displacement of steering gear input element 12 with respect to steering hand member C can readily be reversed by manual manipulation of power steering control element 56, by means of which the current flow through reversible electric motor 34 may be shifted from one coil winding to the other coil winding, thus reversing the direction of motor rotation.

A steering maneuver may be executed entirely by power, with the steering hand member C held in fixed position while the power operable steering drive device B does the work involved in rotating steering gear input element 12. The same steering maneuver may be executed entirely by manual rotation of steering hand member C, while the power operable steering drive device remains inactive. Frequently, it will be advantageous to execute steering maneuvers by a combination of power and manual steering; coarse turning can be accomplished by the power operable steering drive device, and finely controlled modification thereof can be accomplished by simultaneous manual rotation of the steering hand member. The rate of vehicle turn can be increased by simultaneously rotating the steering hand member in the direction of the power-effected turn. Accordingly, the rate of vehicle turn can be decreased by simultaneously rotating the steering hand member in the direction opposite to that of the power-effected turn.

The reaction torque of power operable steering drive device B is transmitted to steering hand member C; therefore, manual turning effort must be applied to steering hand member C in order to effect rotation of steering gear input element 12. If power operable steering drive device B were to be made active without applying manual turning effort to steering hand member C, the effect would be to cause the steering hand member to be rotated in a direction counter to that of the intended power-effected turn.

When steering maneuvers are executed by manually rotating steering hand member C while reversible electric motor 34 is inactive, power operable steering drive device B serves as a direct coupling between steering gear input element 12 and steering hand member C, thus maintaining a fixed relationship between steering gear input element 12 and steering hand member C. When reversible electric motor 34 is active, power operable steering drive device B serves as a rotatably shiftable coupling between steering gear input element 12 and steering hand member C, thus disrupting the fixed relationship described above.

Manual turning effort applied to steering hand member C is always transmitted to steering gear input element 12 through driving gear element 38 and driven gear element 31, whether or not reversible electric motor 34 is active. Referring to FIGURE 2, if turning effort is applied to the steering hand member so as to cause carrier member 21 to be rotated in a clockwise direction, a thrust force will be applied to the hub end of driving gear element 38 by the end-face of bearing 36. This thrust force will be transmitted through the teeth of driving gear element 38 to the teeth of driven gear element 31 and thence to stub shaft 27. If turning effort is applied to the steering hand member so as to cause carrier member 21 to be rotated in a counterclockwise direction, a thrust force will be applied to the outer end of driving gear element 38 by the end-face of bearing 37. Accordingly, this thrust force will also be transmitted through the teeth of driving gear element 38 to the teeth of driven gear element 31 and thence to stub shaft 27. For most motor vehicle installations it is desirable that driving gear element 38 and driven gear element 31 be of "irreversible" construction; i.e., turning effort applied to driving gear element 38 can cause rotation of driven gear element 31; but turning effort applied to driven gear element 31 cannot cause rotation of driving gear element 38. It will be apparent that if driving gear element 38 and driven gear element 31 were not of irreversible construction, the fixed relationship between steering hand member C and steering gear input element 12 would not be maintained during the execution of manual steering maneuvers, as has been described in the preceding paragraph. This condition would, under some driving conditions, necessitate that the steering hand member be rotated in order to hold the steerable wheels in fixed position. It would be possible to eliminate the above described unfavorable characteristic by utilizing some form of holding device operable to block stub shaft 27, driving gear element 38, or driven gear element 31 against rotation with respect to carrier member 21 when reversible electric motor 34 is inactive. In some types of vehicles a limited amount of "reversibility" may be acceptable.

When the vehicle operator grasps manual steering control element 48 and controls the course of the motor vehicle therewith, without manually disturbing power steering control element 56, reversible electric motor 34 will be inactive and turning maneuvers can be executed only by rotating the steering hand member. When the vehicle operator grasps power steering control element 56 and applies turning effort in a clockwise direction, power steering control element 56 will pivot on center post 57 and cause pin member 61 to deflect arm 51a of U-shaped spring conductor member 51 so that the contact pad thereon will bear against the contact pad on stationary switch arm 53, thereby completing the electrical circuit through the coil winding of reversible electric motor 34, which causes stub shaft 27 to be rotated in a clockwise direction with respect to the steering hand member C. Accordingly, when the vehicle operator grasps power steering control element 56 and applies turning effort in a counterclockwise direction, pin member 61 will deflect arm 51b so that the contact pad thereon will bear against the contact pad on stationary switch arm 55, thereby completing the electrical circuit through the coil winding of reversible electric motor 34 which causes stub shaft 27 to be rotated in a counterclockwise direction with respect to the steering hand member C. Power turns to the right may thus be accomplished by applying clockwise turning effort to any of spoke members 62, and power turns to the left may be accomplished by applying counterclockwise turning effort to any of spoke members 62. The entire steering hand member C may be rotated in either direction by applying manual turning effort, as required, to any of spoke members 62, thus effecting a combination of power and manual steering. A driver may choose to hold onto manual steering control element 48 at all times and operate power steering control element 56 with a finger or with the other hand.

Figure 7:
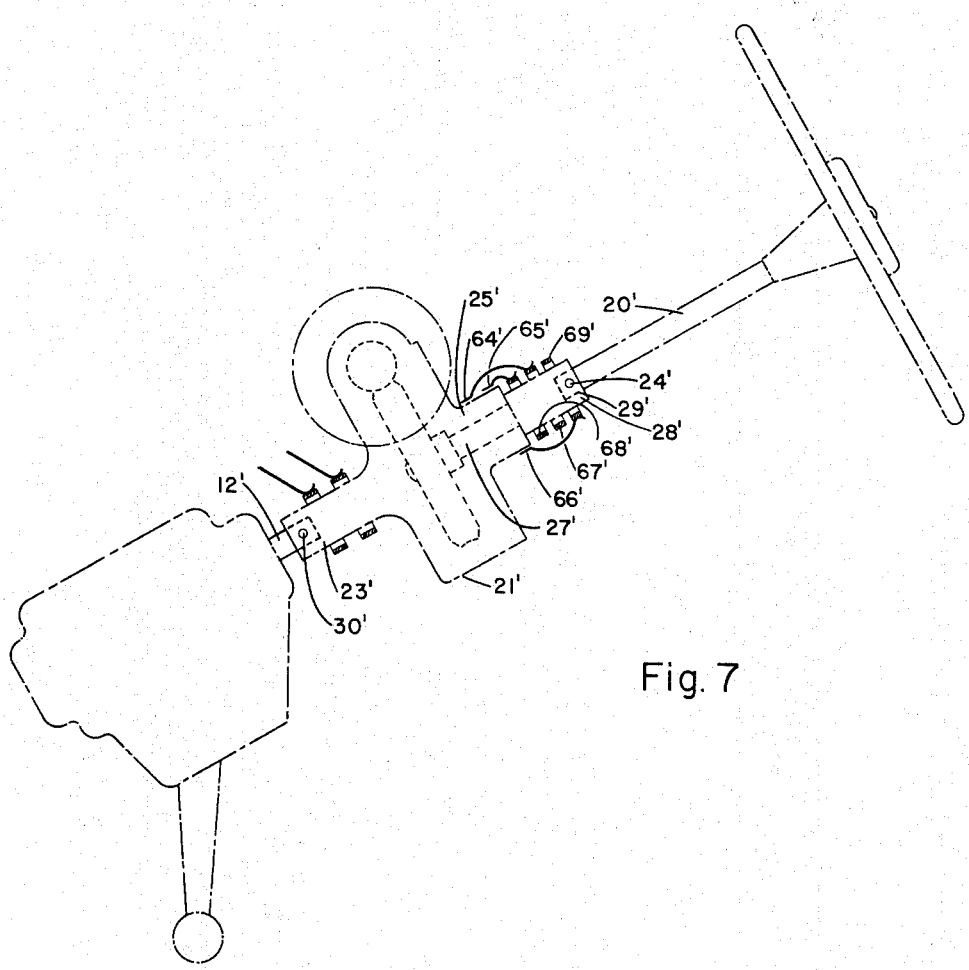
FIGURE 7 is a diagrammatic view of a power operable steering drive device similar mechanically to that illustrated in FIGURES 1 and 2 but installed inverted endways.

The power operable steering drive device shown in FIGURES 1 and 2 can be adapted for installation when inverted endways as illustrated diagrammatically in FIGURE 7. In FIGURE 7, extended hub 23' of carrier member 21' serves to receive the upper end of steering gear input element 12', and pin 30' is utilized to secure extended hub 23' in fixed position on steering gear input element 12'. The lower end of steering hand member shaft 20' is fitted into axial mounting hole 29' of stub shaft 27' and held fast therein by pin 24'. When the reversible electric motor is active, carrier member 21' will be rotated with respect to the steering hand member. With the reversible electric motor mounted on carrier member 21', rotary motion between carrier member 21' and the steering hand member necessitates the use of sliding connections in the wiring extending therebetween. Sliding contacts 64', 65' and 66' are mounted upon hub 25' of carrier member 21' in an electrically insulated manner. Sliding contacts 64', 65' and 66' are in continuous electrical communication with electrical conductor rings 67', 68' and 69', respectively, which are mounted upon the enlarged outer end portion 28' of stub shaft 27' in an electrically insulated manner. Electrical conductor rings 67', 68' and 69' are connected with U-shaped spring conductor member 51, stationary switch arm 53, and stationary switch arm 55, respectively, and the associated sliding contacts 64', 65' and 66' are connected so as to preserve the electrical circuitry as illustrated in FIGURE 6. Performance characteristics of the installation illustrated in FIGURE 7 are equivalent to the performance characteristics of the installation illustrated in FIGURE 1.

My novel power operable steering drive device and steering hand member have been described in connection with a steering gear of the circulating-ball type. It should be understood that my power operable steering drive device and steering hand member may be utilized in connection with many different types of steering gear having a steering gear input element which is manually rotatable by means of a steering hand member coupled therewith. My power operable steering drive device has been illustrated as a unit separated from the conventional steering gear, but it will be apparent that the device could be combined with the steering gear assembly if desired.

In the preferred embodiment illustrated, the driving gear element 38 is a worm and the driven gear element 31 is a worm wheel; however, other types of gears may be utilized. In some instances it may be desirable to replace the driving gear element with a driving element of some other form suitable for imparting rotational motion, and to replace the driven gear element with a driven element of a cooperating form.

The terms "coupled" and "coupling" as employed throughout this specification and appended claims should be understood to be limited to means whereby one rotatable member is joined, connected, associated, united or engaged with another rotatable member in a manner which permits the transmitting of turning effort from the one rotatable member to the other rotatable member.

I claim:

1. Power assistable steering mechanism for motor vehicles including a source of electrical energy, manually controllable electrical circuit opening and closing means, and the manually rotatable combination comprising: a steering hand member, a steering gear input element, and power operable steering drive means coupling said hand member with said input element, said drive means including a driven element coupled with one of said hand member or said input element, a driving element disposed for coaction with said driven element and reaction against the other of said hand member or said input element, and electric motor means energizable in response to the operation of said circuit opening and closing means and adapted for imparting motion to said driving element so as to effect rotational displacement of said input element relative to said steering hand member in either of two opposite directions, wherein said motor means is mounted on said manually rotatable combination and rotates with said combination, and wherein said electrical circuit opening and closing means is so constructed and arranged as to be manually controllable irrespective of the magnitude of the manual torque applied to said hand member.

2. Power assistable steering mechanism for motor vehicles including a source of electrical energy, manually controllable electrical circuit opening and closing means, and the manually rotatable combination comprising: a steering hand member for applying manual turning effort to said manually rotatable combination, a steering gear input element, and power operable steering drive means coupling said hand member with said input element, said drive means including a driven gear element coupled with one of said hand member or said input element, a driving gear element disposed with the axis thereof in substantially fixed relationship with the other of said hand member or said input element, said driven gear element cooperating with said driving gear element for rotation thereby, and electric motor means energizable in response to the operation of said circuit opening and closing means and adapted for imparting motion to said driving gear element so as to effect rotational displacement of said input element relative to said steering hand member in either of two opposite directions, wherein said motor means is mounted on said manually rotatable combination and rotates with said combination, and wherein said electrical circuit opening and closing means is so constructed and arranged as to be manually controllable irrespective of the magnitude and direction of the manual turning effort applied to said hand member.

3. Power assistable steering mechanism for motor vehicles including a source of electrical energy, manually controllable electrical circuit opening and closing means, and the manually rotatable combination comprising: a steering hand member for applying manual turning effort to said manually rotatable combination, a steering gear input element, and power operable steering drive means coupling said hand member with said input element, said drive means including a carrier member coupled with said hand member, a driving gear element rotatably mounted on said carrier member, a driven gear element in coacting relationship with said driving gear element, said driven gear element being coupled with said input element, and electric motor means energizable in response to the operation of said circuit opening and closing means and adapted for imparting motion to said driving gear element so as to effect rotational displacement of said input element relative to said steering hand member in either of two opposite directions, wherein said motor means is mounted on said manually rotatable combination and rotates with said combination, and wherein said electrical circuit opening and closing means is so constructed and arranged as to be manually controllable irrespective of the magnitude and direction of the manual turning effort applied to said hand member.

4. The combination defined in claim 3 wherein said driving gear element and said driven gear element are of irreversible construction.

5. Power assistable steering mechanism for motor vehicles including a source of electrical energy, manually controllable electrical switch means, and the manually rotatable combination comprising: a steering hand member, a steering gear input element, and power operable steering drive means coupling said hand member with said input element, said drive means having a carrier member coupled with said hand member, a driving gear element rotatably mounted on said carrier member, a driven gear element coupled with said input element and arranged so as to be in meshing relationship with said driving gear element, and a reversible electric motor mounted on said carrier member, said motor having a rotatable output shaft coupled with said driving gear element so as to effect rotational displacement of said input element relative to said steering hand member in either of two opposite directions in response to operation of said switch means, wherein said motor is rotatable with said manually rotatable combination, and wherein said switch means is operated by a control element disposed on said hand member for manual functioning thereof.

6. Power assistable steering mechanism for motor vehicles including a source of electrical energy, manually controllable electrical circuit opening and closing means, and the manually rotatable combination comprising: a steering hand member for applying manual turning effort to said manually rotatable combination, a steering gear input element, and power operable steering drive means coupling said hand member with said input element, said drive means including a carrier member coupled with said input element, a driving gear element rotatably mounted on said carrier member, a driven gear element in coacting relationship with said driving gear element, said driven gear element being coupled with said hand member, and electric motor means energizable in response to the operation of said circuit opening and closing means and adapted for imparting motion to said driving gear element so as to effect rotational displacement of said input element relative to said steering hand member in either of two opposite directions, wherein said motor means is mounted on said manually rotatable combination and rotates with said combination, and wherein said electrical circuit opening and closing means is so constructed and arranged as to be manually controllable irrespective of the magnitude and direction of the manual turning effort applied to said hand member.

7. The combination defined in claim 6 wherein said driving gear element and said driven gear element are of irreversible construction.

8. Power assistable steering mechanism for motor vehicles including a source of electrical energy, manually controllable electrical switch means and the manually rotatable combination comprising: a steering hand member, a steering gear input element, and power operable steering drive means coupling said hand member with said input element, said drive means having a carrier member coupled with said input element, a driving gear element rotatably mounted on said carrier member, a driven gear element coupled with said hand member and arranged so as to be in meshing relationship with said driving gear element, and a reversible electric motor mounted on said carrier member, said motor having a rotatable output shaft coupled with said driving gear element so as to effect rotational displacement of said input element relative to said steering hand member in either of two opposite directions in response to the operation of said switch means, wherein said motor is rotatable with said manually rotatable combination, and wherein said switch means is operated by a control element disposed on said hand member for manual functioning thereof.

References Cited by the Examiner

UNITED STATES PATENTS

| Re. 23,550 | 9/52 | Staude. | |
| Re. 23,673 | 6/53 | Penrose | 318—2 |
| 1,477,480 | 12/23 | Groene | 318—2 |
| 1,966,209 | 7/34 | Miller | 74—625 X |
| 2,694,938 | 11/54 | Green et al. | 74—384 X |
| 2,754,465 | 7/56 | Brier | 318—2 X |
| 2,800,801 | 7/57 | Lincoln et al. | 180—79.1 |
| 2,805,585 | 9/57 | Besserman | 74—388 X |
| 2,967,980 | 1/61 | Ovshinsky | 74—388 X |

ORIS L. RADER, *Primary Examiner.*